H. BECK.
MANUFACTURE OF HEATING APPARATUS.
APPLICATION FILED MAR. 12, 1909.

1,016,910.

Patented Feb. 6, 1912.

2 SHEETS—SHEET 1.

H. BECK.
MANUFACTURE OF HEATING APPARATUS.
APPLICATION FILED MAR. 12, 1909.
1,016,910.
Patented Feb. 6, 1912.
2 SHEETS—SHEET 2.
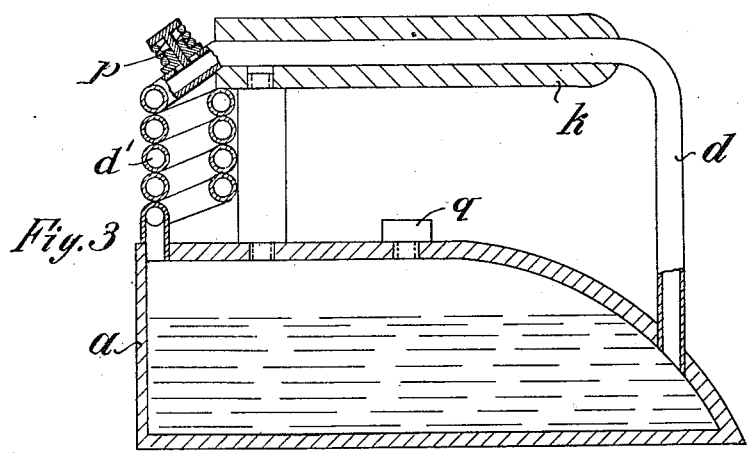
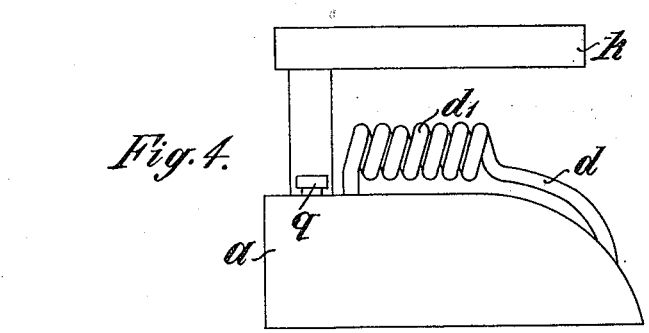
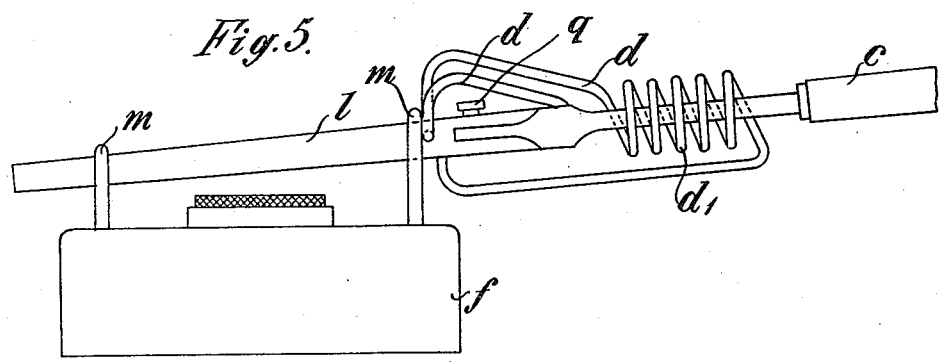
Witnesses:
Inventor:

UNITED STATES PATENT OFFICE.

HEINRICH BECK, OF BERLIN, GERMANY.

MANUFACTURE OF HEATING APPARATUS.

1,016,910.  Specification of Letters Patent. Patented Feb. 6, 1912.

Application filed March 12, 1909. Serial No. 482,935.

*To all whom it may concern:*

Be it known that I, HEINRICH BECK, a subject of the German Emperor, and resident of Berlin, Germany, have invented certain new and useful Improvements in the Manufacture of Heating Apparatus, of which the following is a specification.

This invention relates to portable heating apparatuses, which are adapted to maintain a certain temperature with perfect safety.

An object of the invention is to provide a portable heating apparatus, comprising a vessel filled with liquid, which continuously evaporates as long as the flame of the heating apparatus is in close proximity to the vessel.

Another object is to provide a vessel, wherein the vapors arising from heating the liquid in said vessel are continuously condensed and returned into the same vessel.

Another object is to provide means for facilitating the condensing of said vapors before they return into the vessel.

Another object is to provide means in co-action with the condensing portions of the vessel for discharging the vapors after they have attained a certain pressure, which would be detrimental to the safety of the apparatus as a household furniture.

Other objects will be more fully understood by reference to the specification and will be pointed out in and by the appended claims and drawings.

Figure 1:
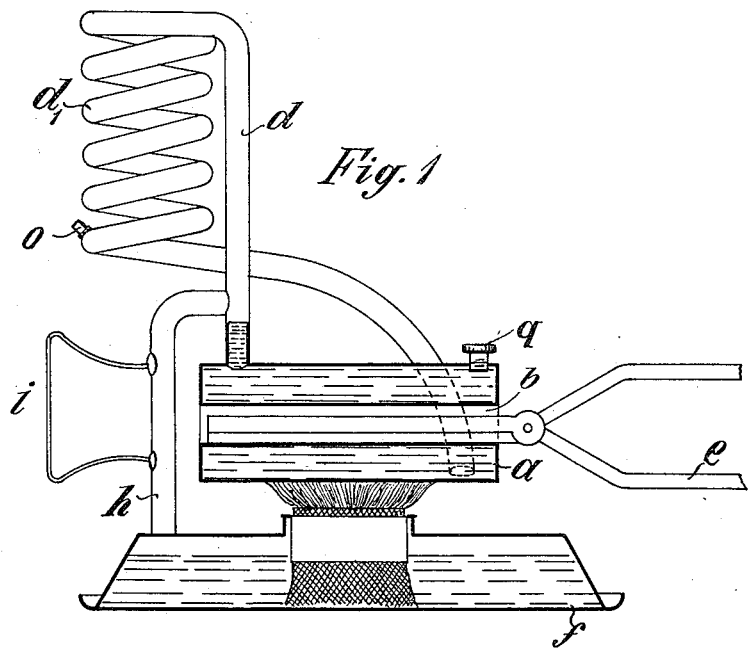
Figure 2:
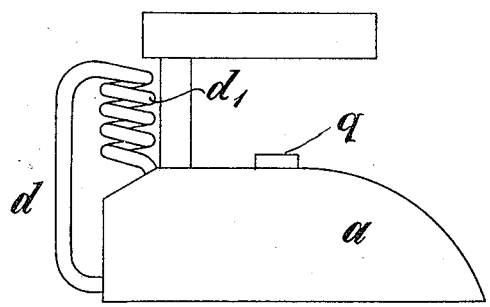

Figure 1 shows a heating-apparatus with a cooling-serpentine for curling irons. Fig. 2 shows a side elevation of a flat-iron. Fig. 3 shows a similar iron in a longitudinal section. Fig. 4 shows the side elevation of a modified flat-iron according to Fig. 2. Fig. 5 shows in side elevation a curling iron with a condensing device and a heating apparatus.

Similar letters refer to similar parts throughout the several views.

In Fig. 1 the vessel or receptacle $a$ is provided with a cavity $b$ for receiving the object to be heated, for instance curling-irons $e$. The vessel $a$ is partly filled with oil or another suitable fluid, and is closed on all sides with the exception of an opening formed in the tube $d$. The portion $d'$ of the tubing is bent helically for the purpose of increasing the cooling effect on the vapors. In this figure the heating-lamp $f$ is connected with the vessel $a$ of the heating-apparatus through a cross-piece $h$, on which is provided a handle $i$.

In the case of the flat iron according to Fig. 2 there has been provided on the vessel $a$ a condensing-tube $d$, which terminates in a cooling-serpentine $d^1$. In the construction according to Fig. 3 of the flat-iron, the condensing-tube $d$ provided on the vessel $a$, passes through the handle $k$ of the flat-iron. In the construction according to Fig. 4 the condensing-tube $d$ with the cooling-serpentine $d^1$ is arranged below the handle $k$. In the construction shown in Fig. 5, the shank or leg $l$ of the curling-irons $c$ forms a fluid-vessel, and is provided with a condensing-tube $d$, which, in a part of its length, forms a cooling-serpentine $d^1$. The heating-lamp $f$ is provided with cross-pieces $m$ for holding the curling-irons $c$.

As to the general method of manufacturing all the hereinbefore described forms of construction of my invention, there is to be said that the vessels which are to serve as heating-apparatus are filled to a certain extent with suitable fluid, for instance petroleum, or any other oil. The fluid to be selected, or if mixtures of fluids are used, the proportion in which they are to be mixed, entirely depends on the degree of heating-temperatures to be attained with these heating-devices. With petroleum temperatures of from about 150° to 400° can be attained. These portable heating-apparatus are perfectly closed, but before they are closed the fluid is heated to the required extent, so that eventually certain parts of the mixture which easily evaporate, as is the case with petroleum, are caused to evaporate and to escape, so that only the ingredients of the fluid which less easily evaporate remain behind. In this way it is possible to obtain more constant and higher temperatures with these heating-apparatus, which can be ascertained by testing-instruments, and the air is also expelled from the vessels. By the total or partial vacuum produced in the vessels more constant pressures and temperatures are obtained; decomposition of the fluid, especially oxidation and chemical changes caused by oxidation are prevented, these changes being adapted to influence the pressure and temperature of the fluid; the expulsion of air also prevents the collection of dirt and dust in the apparatus. Instead of producing a vacuum in the vessels, they can also be filled with indifferent gases, for instance hydrogen or other gases, which neither cause decomposition nor oxidation, of the fluid, but the vacuum is to be preferred to the latter process.

The fluid-vessels of the portable heating-apparatus are preferably also provided at a suitable place with a safety-valve against dangerous overpressure or overheating. These safety-valves may be spring-valves as indicated by $p$ in Fig. 3 or closing-pieces of the condensing-tube $d$, consisting, for instance, of metal alloys of a suitable and known kind, which melt at the critical temperature. These safety-valves are preferably so adjusted that they act when the pressure in the vessel is still below the atmospheric pressure, so that, if the safety-valves work, the fluid cannot be forcibly ejected. An apparatus thus constructed and fitted out will therefore work without the least danger as long as the safety-valve acts. The safety-valve is preferably put in at that place of the apparatus where under normal circumstances the least heating takes place. This place would, for instance, in the arrangement according to Fig. 1 be at the end of the cooling serpentine at $o$. A removable plug $q$ may serve for closing the aperture, through which the vessels may be filled with liquid.

Having thus particularly described and ascertained the nature of my invention and in what manner the same is to be performed, what I claim is:

1. A portable device of the class described comprising a closed vessel adapted to be heated from the exterior thereof, a liquid in said vessel of a boiling temperature higher than water and a circuitous and uninterrupted conduit extending from the interior of the vessel and returning to the same for conveying the vapors generated by the heat back to the liquid.

2. A portable device of the class described comprising a closed vessel adapted to be heated from the exterior thereof, a liquid in said vessel of a boiling temperature higher than water, and a circuitous and uninterrupted conduit extending from the interior of the vessel and returning to the same, a portion of said conduit having the form of a spiralic tubing for condensing the vapors generated by the heat and for conveying the same back to the liquid.

3. A portable device of the class described comprising in combination with a source of heat a closed vessel including portions partly surrounding an orifice adapted to receive an article to be heated, a liquid in said vessel of a boiling temperature higher than water and a circuitous and uninterrupted conduit extending from the interior of the vessel and returning to the same, a portion of said conduit having the form of a spiralic tubing.

In testimony whereof I have signed my name to this specification in the presence of two subscribing witnesses.

HEINRICH BECK.

Witnesses:
 BERTA BECK,
 LAURA RUCK.